US006931071B2

United States Patent
Haddad et al.

(10) Patent No.: US 6,931,071 B2
(45) Date of Patent: Aug. 16, 2005

(54) APPARATUS AND METHOD FOR SYNCHRONIZING VIDEO AND AUDIO MPEG STREAMS IN A VIDEO PLAYBACK DEVICE

(75) Inventors: Semir S. Haddad, San Jose, CA (US); Amandeep K. Dhillon, Sunnyvale, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 671 days.

(21) Appl. No.: 09/943,793

(22) Filed: Aug. 31, 2001

(65) Prior Publication Data

US 2003/0043924 A1 Mar. 6, 2003

(51) Int. Cl.[7] .............................................. H04N 7/12
(52) U.S. Cl. ................ 375/240.28; 370/486; 348/423.1
(58) Field of Search ....................... 375/240.28, 240.01, 375/240, 240.1; 370/498, 486, 473; 348/423.1; 704/500; 380/46

(56) References Cited

U.S. PATENT DOCUMENTS

| 5,652,627 A | | 7/1997 | Allen | |
|---|---|---|---|---|
| 5,726,989 A | | 3/1998 | Dokic | |
| 5,787,179 A | * | 7/1998 | Ogawa et al. ................ 380/46 |
| 5,832,256 A | | 11/1998 | Kim | |
| 6,061,399 A | * | 5/2000 | Lyons et al. ................ 375/240 |
| 6,101,195 A | * | 8/2000 | Lyons et al. ................ 370/498 |
| 6,351,474 B1 | * | 2/2002 | Robinett et al. ............. 370/486 |
| 6,356,871 B1 | * | 3/2002 | Hemkumar et al. ........ 704/500 |
| 6,584,120 B1 | * | 6/2003 | Shiomoto et al. ........... 370/473 |

FOREIGN PATENT DOCUMENTS

EP         1 076 461 A1     2/2001

* cited by examiner

Primary Examiner—Gims Philippe
(74) Attorney, Agent, or Firm—Lisa K. Jorgenson; William A. Munck

(57) ABSTRACT

There is disclosed an MPEG decoder comprising: 1) a packetized elementary stream (PES) interface for receiving a plurality of packetized elementary streams associated with a single video program; 2) a presentation time stamp (PTS) detection circuit for detecting presentation time stamps in the packetized elementary streams and extracting the presentation time stamps therefrom; and 3) a selection circuit for selecting presentation time stamps associated with a first one of the plurality of packetized elementary streams and transmitting the selected presentation time stamps to a clock generation circuit, wherein the clock generation circuit generates a first reference clock signal used by a first decoder to decode the first packetized elementary stream. The clock generation circuit further generates a second reference clock signal synchronized to the first reference clock signal, wherein the second reference clock signal is used by a second decoder to decode a second packetized elementary stream in synchronization with the first packetized elementary stream.

21 Claims, 6 Drawing Sheets

APPARATUS AND METHOD FOR SYNCHRONIZING VIDEO AND AUDIO MPEG STREAMS IN A VIDEO PLAYBACK DEVICE

CROSS-REFERENCE TO RELATED APPLICATIONS

The present invention is related to those disclosed in the following United States Patent Applications:

1. Ser. No. 09/943,837, filed concurrently herewith, entitled "SYSTEM FOR MULTIPLEXING VIDEO DATA STREAMS IN A DIGITAL VIDEO RECORDER AM) METHOD OF OPERATING THE SAME;"
2. Ser. No. 09/943,815, filed concurrently herewith, entitled "APPARATUS AND METHOD FOR INDEXING MPEG VIDEO DATA TO PERFORM SPECIAL MODE PLAYBACK IN A DIGITAL VIDEO RECORDER";
3. Ser. No. 09/943,791, filed concurrently herewith, entitled "DIGITAL VIDEO RECORDER USING CIRCULAR FILE MANAGEMENT AND METHOD OF OPERATION;"
4. Ser. No. 09/944,729, filed concurrently herewith, entitled "SYSTEM FOR DETECTING START CODES IN MPEG VIDEO STREAMS AND METHOD OF OPERATING THE SAME;"

The above applications are commonly assigned to the assignee of the present invention.

The disclosures of these related patent applications are hereby incorporated by reference for all purposes as if fully set forth herein.

TECHNICAL FIELD OF THE INVENTION

The present invention is generally directed to digital video playback device and, more specifically, to an apparatus and method, for use in a digital video recorder (DVR), for synchronizing video and audio streams during playback of a recorded television program.

BACKGROUND OF THE INVENTION

Digital video recorder (DVR) systems are becoming increasingly popular with consumers. Digital video recorder systems use magnetic hard disk drives rather than magnetic cassette tapes to store video programs. For example, the ReplayTV™ recorder and the TiVO™ recorder record television programs in digital formats on hard disk drives using, for example, MPEG-2 compression. Also, some DVR systems may record on a readable/writable digital versatile disk (DVD) rather than a magnetic disk.

MPEG-2 compression is essential for storing a recorded television program. An uncompressed video program would require an enormous (and impractical) amount of storage space on a disk drive. Similarly, multimedia systems require an enormous amount of bandwidth to provide services such as video-on-demand, videoconferencing, and the like. However, the inherent limitations on network bandwidth are a primary inhibitor to the performance of such systems.

Therefore, compression and communication standards have been developed to overcome the bandwidth limitations of conventional communication networks. These standards define the compression of video and audio data and the delivery of control data in a single bit stream transmitted in a frequency band that would before only accommodate an analog program.

Moving Picture Experts Group (MPEG) is a family of audio and video compression standards. In the MPEG-2 standard, video compression is defined both within a given picture (i.e., spatial compression) and between pictures (i.e., temporal compression). Spatial compression is accomplished by conversion of a digital image from the time domain to the frequency domain by a discrete cosine transform, quantization, variable length coding, and Huffman coding. Temporal compression is accomplished via a process referred to as motion compensation in which a motion vector is used to describe the translation of picture elements between picture frames.

ISO 13818-1 is the transport layer portion of the MPEG-2 standard, and specifies: i) packetization of audio and video elementary bit streams into packetized elementary streams (PESs), and ii) combination of audio and video PESs into a single time division or packet multiplexed bit stream for transmission and subsequent de-multiplexing into multiple bit streams for decompression and display. The single time division or packet multiplexed bit stream is as shown from various conceptual perspectives in FIGS. 1 to 5.

FIG. 1 illustrates a conceptual block diagram (generally designated 100) of the packetization of audio and video elementary bit streams and packet multiplexing according to an exemplary embodiment of the prior art. Distinct elementary streams are formed in audio encoder 105, video encoder 110, auxiliary (or other data) source 115, and systems data source 120. Each of these elementary streams is packetized into a packetized elementary stream (PES). The packetized elementary streams of audio data, video data, and the packets of other data and systems data are packet multiplexed by a MPEG-2 multiplexer into an MPEG-2 system stream.

FIG. 2 illustrates a conceptual block diagram of an exemplary time-division or packet-multiplexed bit stream (generally designated 200) according to an exemplary embodiment of the prior art. Bit stream 200 comprises a transport packet stream, wherein each packet illustratively comprises packet header 205 and payload 210 (i.e., packet data bytes) and, according to FIG. 2, optional adaptation field 215. An MPEG-2 bit stream comprises two layers, namely, a system layer (also referred to as an outer layer, a control layer, or the like) and a compression layer (also referred to as an inner layer, a payload layer, a data layer, or the like).

The MPEG-2 system layer facilitates (i) multiplexing one or more programs made up of related audio and video bit streams into a single bit stream for transmission through a transmission medium, and (ii) de-multiplexing of the single bit stream into separate audio and video program bit streams for decompression while maintaining synchronization. The system layer defines data stream syntax for timing control and synchronization and interleaving of the video and audio bit streams. The system layer is capable of: i) video and audio synchronization, ii) stream multiplexing, iii) packet and stream identification, iv) error detection, v) buffer management, vi) random access and program insertion, vii) private data, viii) conditional access, and ix) interoperability with other networks, such as those using asynchronous transfer mode (ATM). The MPEG-2 compression layer comprises the coded video and audio data streams. The system layer provides control data for multiplexing and de-multiplexing interleaved compression layers and, in doing so, defines those functions necessary for combining the compressed data streams.

FIG. 3 illustrates a conceptual block diagram of an MPEG-2-compliant decoding system (generally designated 300) according to an exemplary embodiment of the prior art.

The components of decoding system 300 are well known to the skilled in the art and are therefore introduced for illustrative purposes only. Discussion of the functionality of these components will therefore be limited.

Decoding system 300 receives bit stream 200 as an input to system decoder 305. System decoder 305 de-multiplexes the system layer data of bit stream 200 into the compressed audio layer, the compressed video layer, and control data. The exemplary compressed audio layer data and video layer data are transferred to audio data buffer 310a and video data buffer 310v, respectively. The audio layer data is subsequently processed in audio decoder control block 315a and audio decoder 320a. The video layer data is subsequently processed in video decoder control block 315v and video decoder 320v. Exemplary control data is shown as program clock recovery (PCR) data, enable data, and startup values.

The MPEG-2 system layer supports a plurality of functions, namely, i) packet multiplexing and de-multiplexing of multiplexed multiple bit streams, ii) synchronous display of multiple coded bit streams, iii) buffer management and control, iv) time recovery and identification, v) random access, vi) program insertion, vii) conditional access, and viii) error tracking.

The MPEG-2 standard specifies two types of layer coding, namely, a program stream (PS) layer coding for relatively loss-less environments (e.g., CD-ROMS, DVDs, etc) and transport stream (TS) layer coding for lossy environments (e.g., cable television, satellite television, or other broadcast environments). Referring back to FIG. 2, bit stream 200 is illustratively a transport stream (TS) consisting of a plurality of TS packets divided into a packet header, an optional adaptation field, and the associated packet data (or payload). By contrast FIG. 4 illustrates a conceptual block diagram of a PES (generally designated 400) according to an exemplary embodiment of the prior art.

Packetized elementary stream (PES) 400 comprises packet header 405, optional PES header 410, and associated packet data 415. Packet header 405 comprises packet start code prefix 420, stream identifier (ID) 425, and PES packet length indicator 430. In accord herewith, all of the fields after PES packet length indicator 430 are optional. PES header 410 includes a presentation time stamp (PTS) field, a decoding time stamp (DTS) field, an elementary stream clock reference (ESCR) field, a elementary stream (ES) rate field, a DSM trick mode field, a copy information field, a prior PES clock recovery field, an extension field, and stuffing bytes.

Packet start code prefix 420 provides packet synchronization. Stream ID 425 provides packet identification and payload identification. PTS/DTS flag fields 435 and PTS/DTS fields 440 provide presentation synchronization. Data transfer is provided through the packet/header length 445, payload 415, and stuffing fields 450. Scramble control field 455 facilitates payload de-scrambling.

FIG. 5 illustrates a conceptual block diagram of an alternate time-division or packet-multiplexed bit stream (generally designated 200) according to an exemplary embodiment of the prior art. Bit stream 200 comprises access units 500, PES packets 400, and a plurality of TS packets 505. Bit stream 200 illustrates a layering relationship among access units 500, PES packets 400, and TS packets 505.

The TS layer operates to combine programs made up of PES-coded data with one or more independent time bases into a single stream. In accord with MPEG-2, a specific program does not require a unique time base, but if it does have a unique time base, the time base is the same for all of the elements of that program.

The PES layer is an inner layer portion of the MPEG-2 time division or packet multiplexed stream upon which the transport or program streams are logically constructed. The PES layer provides stream specific operations and supports the following: i) a common base of conversion between program and transport streams, ii) time stamps for video and audio synchronization and associated timing, especially for associated audio and video packets making up a broadcast channel, presentation, or program (collectively hereafter Programs), and having a common time base, iii) stream identification for stream multiplexing and de-multiplexing, and iv) such services as scrambling, VCR functions, and private data.

FIG. 5 further illustrates that, in accord with MPEG-2, each video or audio elementary stream (ES) is PES-packetized before insertion into a transport stream (TS). Elementary streams are continuous and PES packets containing an ES are generally of fixed lengths. Typically, video PES packets are on the order of tens of thousands of bytes and audio PES packets are on the order of thousands of bytes. However, video PES packets can also be specified as of undefined length. ES data, that is, access units 500, are first encapsulated into PES packets, which are, in turn, inserted into TS packets.

A transport stream may contain one or more independent, individual programs, such as individual broadcast television programs, whereby each individual program may have its own time base, and each stream comprises an individual program having its own packet identification (PID). Each separate individual program has one or more elementary streams generally having a common time base. While not illustrated in the PRIOR ART figures, different transport streams may be combined into a single system TS.

At the transport layer, the transport sync byte provides packet synchronization. The PID field data provides packet identification, de-multiplexing and sequence integrity data. The PID field is operable to collect the packets of a stream and reconstruct the stream. Continuity counters and error indicators provide packet sequence integrity and error detection. The payload unit start indicator and adaptation control are used for payload synchronization, while the discontinuity indicator and program clock reference (PCR) fields are used for playback synchronization. The transport scramble control field facilitates payload de-scrambling. Private data transfer is accomplished through the private data flag and private data bytes. The data bytes are used for private payload data transfer, and the stuffing bytes are used to round out a packet.

A transport stream is a collection of transport stream packets linked by standard tables. These tables carry program specific information (PSI) and are built when a TS is created at the multiplexer. These tables completely define the content of the stream. Two of the tables of the TS are the program association table (PAT) and the program map table (PMT). The PAT operates as a table of contents for the TS that contains a unique identifier for the stream, a version number enabling dynamic changes of the PAT and the TS, and an association table of pairs of values. The pairs of values, PN, and PMT-PID, are the program number (PN) and the PID of the tables containing the program.

The PMT, on the other hand, describes all streams comprising a program. Each entry in the PMT is related to one program. The PMT provides a mapping between packets and programs, and contains a program number that identifies the program within the stream, a descriptor to carry private information about the program, the PID of the packets that contain the synchronization information, a number of pairs of values (e.g., stream type (ST), Data-PID) which, for each stream, specify the ST and the PID of the packets containing the data of that stream or program (Data-PID).

Collectively, these tables are used to process a particular program. At any point in time, each program has a unique PID in the PMT, which provides the PIDs for the selected program's audio, video, and control streams. The streams with the selected PIDs are extracted and delivered to the appropriate buffers and decoders for reconstruction and decoding.

Achieving and maintaining clock recovery and synchronization is a problem, especially with audio and video bit streams. In accord with the MPEG-2 standard, an end-to-end constant delay timing model digital image and audio data take the same amount of time to pass through the system from encoder to decoder. The system layer contains timing information that requires constant delay. The clock references are program clock reference (PCR) and the time stamps are the PTS and DTS.

Synchronization is accomplished using the program clock reference (PCR) data field in the TS adaptation field. PCR is typically a 42-bit field that is coded in two parts, a PCR base having a 33-bit value in units of 90 kHz, and a PCR extension having a 9-bit extension in units of 27 MHz, where 27 MHz is the system clock frequency. As a general rule, the first 33 bits of the first PCR received by the decoder initialize the counter in a clock generation, and subsequent PCR values are compared to clock values for fine adjustment. The difference between the PCR and the local clock can be used to drive a voltage-controlled oscillator, or a similar device or function, for example, to speed up or slow down the local clock.

Audio and video synchronization is typically accomplished through the presentation time stamp inserted in the PES header. The presentation time stamp is a 33-bit value in units of 90 kHz, where 90 kHz is the 27 MHZ system clock divided by 300. The presentation time stamp value indicates the time that the presentation unit should be presented to the user.

In digital video systems (e.g., MPEG-2 compliant digital video systems and HDTV compliant digital video systems), the transport layer is used to carry audio data, video data, and system data streams, in packets, to the individual decoders and system memory. The individual streams are multiplexed together with a set of buffer assumptions as defined in the MPEG-2 System Layer specification.

In MPEG transport and program streams, synchronization among multiple elementary streams is accomplished with presentation time stamps (PTS) in the program streams and transport streams. As noted above, time stamps are generally in units of 90 KHz, but the system clock reference (SCR), the program clock reference (PCR) and the optional elementary stream clock reference (ESCR) have extensions with a resolution of 27 MHz. Decoding of N elementary streams is synchronized by adjusting the decoding of streams to a common master time base rather than by adjusting the decoding of one stream to match that of another. The master time base may be one of the clocks of the N decoders, the clock of the data source, or it may be some external clock.

Each program in a transport stream, which may contain multiple programs, may have its own time base. The time bases of different programs within a transport stream may be different. Because presentation time stamps apply to the decoding of individual elementary streams, they reside in the PES packet layer of both the transport streams and the program streams. End-to-end synchronization occurs when encoders save time stamps at capture time, the time stamps propagate with associated coded data to decoders, and the decoders use those time stamps to schedule presentations.

As noted above, synchronization of a decoding system with a channel is achieved through the use of the system clock reference (SCR) in the program stream and by its analog, the program clock reference (PCR), in the transport stream. The SCR and PCR are time stamps encoding the timing of the bit stream itself, and are derived from the same time base used for the audio and video presentation time stamp values from the same program. Since each program may have its own time base, there are separate PCR fields for each program in a transport stream containing multiple programs. In some cases it may be possible for programs to share PCR fields. A program shall have one and only one PCR time base associated with it.

Unfortunately, in a digital video recorder with packetized elementary stream (PES) storage, the systems time clock (STC) and the program clock reference (PCR) are lost when a video program is stored to the disk drive. The program is played back at a later time (i.e., time-deferred viewing). Therefore, there is a need in the art for an improved digital video recorder that implements a new synchronization apparatus and algorithm for audio and video synchronization.

SUMMARY OF THE INVENTION

To address the above-discussed deficiencies of the prior art, it is a primary object of the present invention to provide time-deferred audio-video synchronization playback method for MPEG streams. To achieve audio-video synchronization without a program clock reference, the present invention designates one of the streams of the program as the master, which means that the program time stamp (PTS) values of the master are used as substitutes for the program clock reference. The present invention maintains a counter representing the master PTS values as free-running and synchronizes all the other streams on the master PTS values. The proposed solution is simple, because the same processing is used as with the PCR values, except that a master PTS is used instead of the PCR. The proposed solution also is robust, as the PTS gaps are taken into account.

Accordingly, there is disclosed an MPEG decoder according to the principles of the present invention. According to an advantageous embodiment of the present invention, the MPEG decoder comprises: 1) a packetized elementary stream (PES) interface capable of receiving a plurality of packetized elementary streams associated with a single video program; 2) a presentation time stamp (PTS) detection circuit capable of detecting presentation time stamps in the packetized elementary streams and extracting the presentation time stamps therefrom; and 3) a selection circuit capable of selecting presentation time stamps associated with a first one of the plurality of packetized elementary streams and transmitting the selected presentation time stamps to a clock generation circuit, wherein the clock generation circuit generates a first reference clock signal used by a first decoder to decode the first packetized elementary stream.

According to one embodiment of the present invention, the clock generation circuit further generates a second reference clock signal synchronized to the first reference clock signal and wherein the second reference clock signal is used by a second decoder to decode a second packetized elementary stream in synchronization with the first packetized elementary stream.

According to another embodiment of the present invention, the selected presentation time stamps are video presentation times stamps and the first decoder is a video decoder.

According to still another embodiment of the present invention, the second decoder is an audio decoder.

According to yet another embodiment of the present invention, the selected presentation time stamps are audio presentation times stamps and the first decoder is an audio decoder.

According to a further embodiment of the present invention, the second decoder is a video decoder.

According to a still further embodiment of the present invention, the clock generation circuit generates the second reference clock signal by synchronizing presentation time stamps associated with the second packetized elementary stream with the selected presentation time stamps associated with the first packetized elementary stream.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged video playback device.

Figure 1:
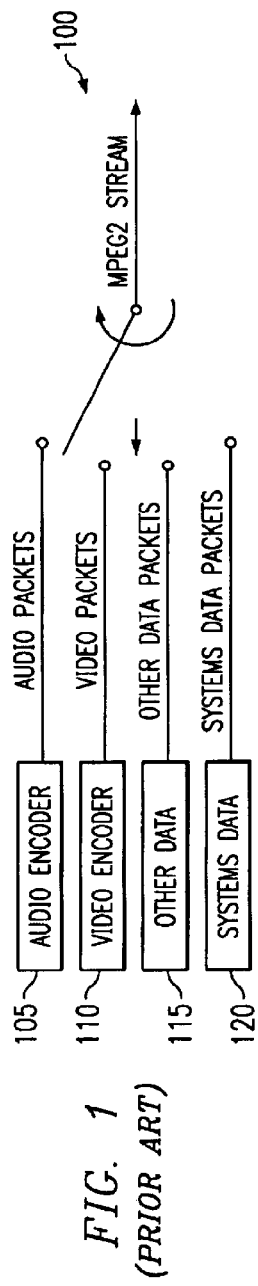
FIG. 1 illustrates a conceptual block diagram of the packetization of audio and video elementary bit streams and packet multiplexing according to an exemplary embodiment of the prior art.
Figure 3:
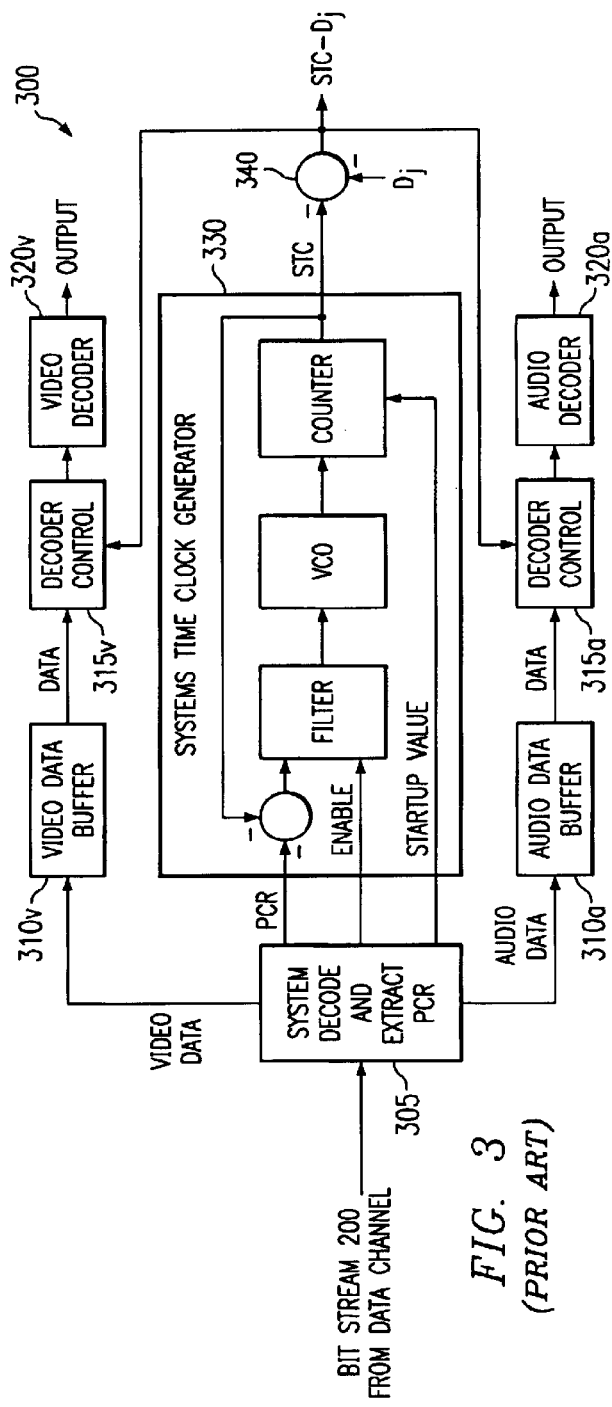
FIG. 3 illustrates a conceptual block diagram of an MPEG-2-compliant decoding system according to an exemplary embodiment of the prior art.
Figure 2:
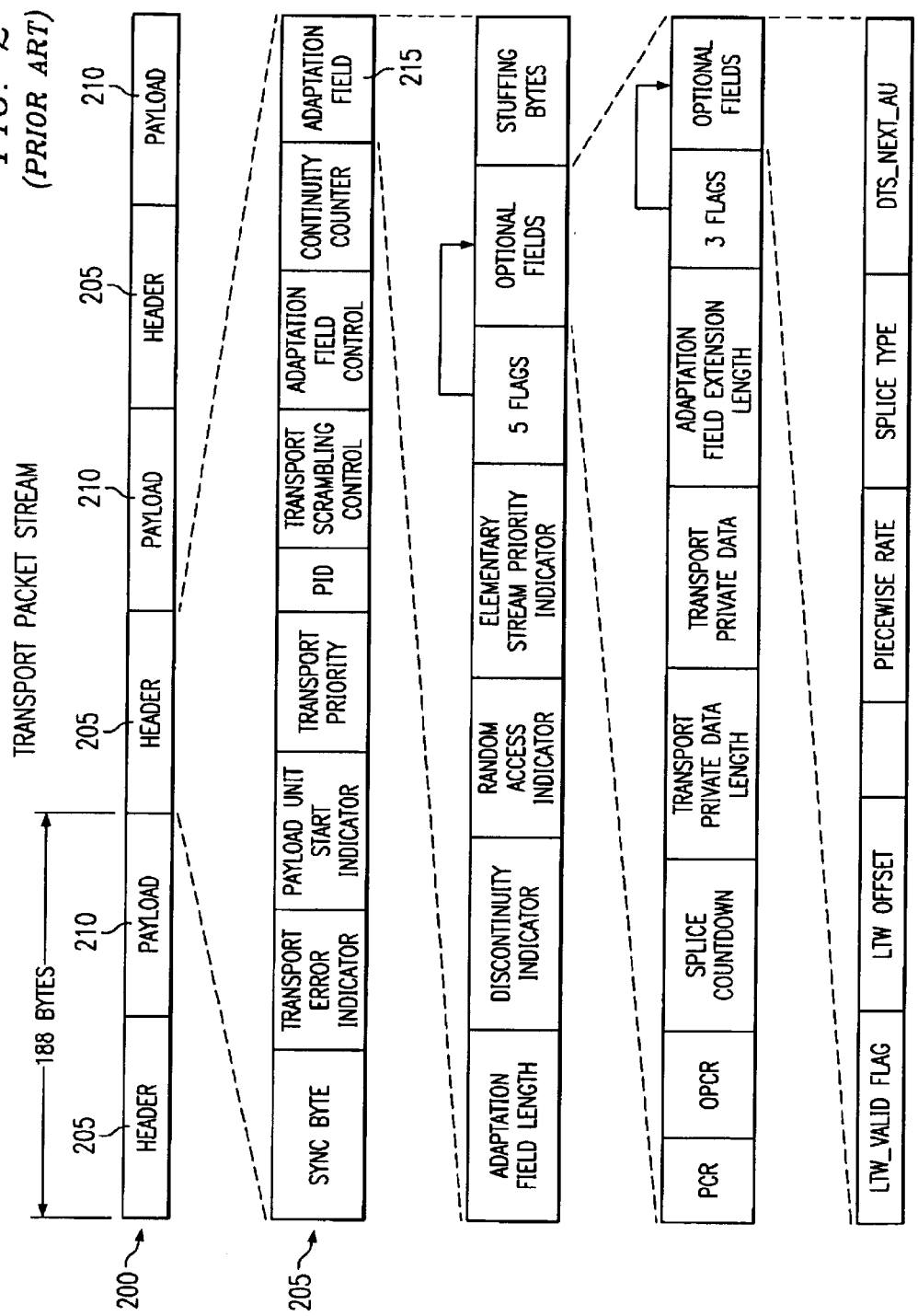
FIG. 2 illustrates a conceptual block diagram of an exemplary time-division or packet-multiplexed bit stream according to an exemplary embodiment of the prior art.
Figure 4:
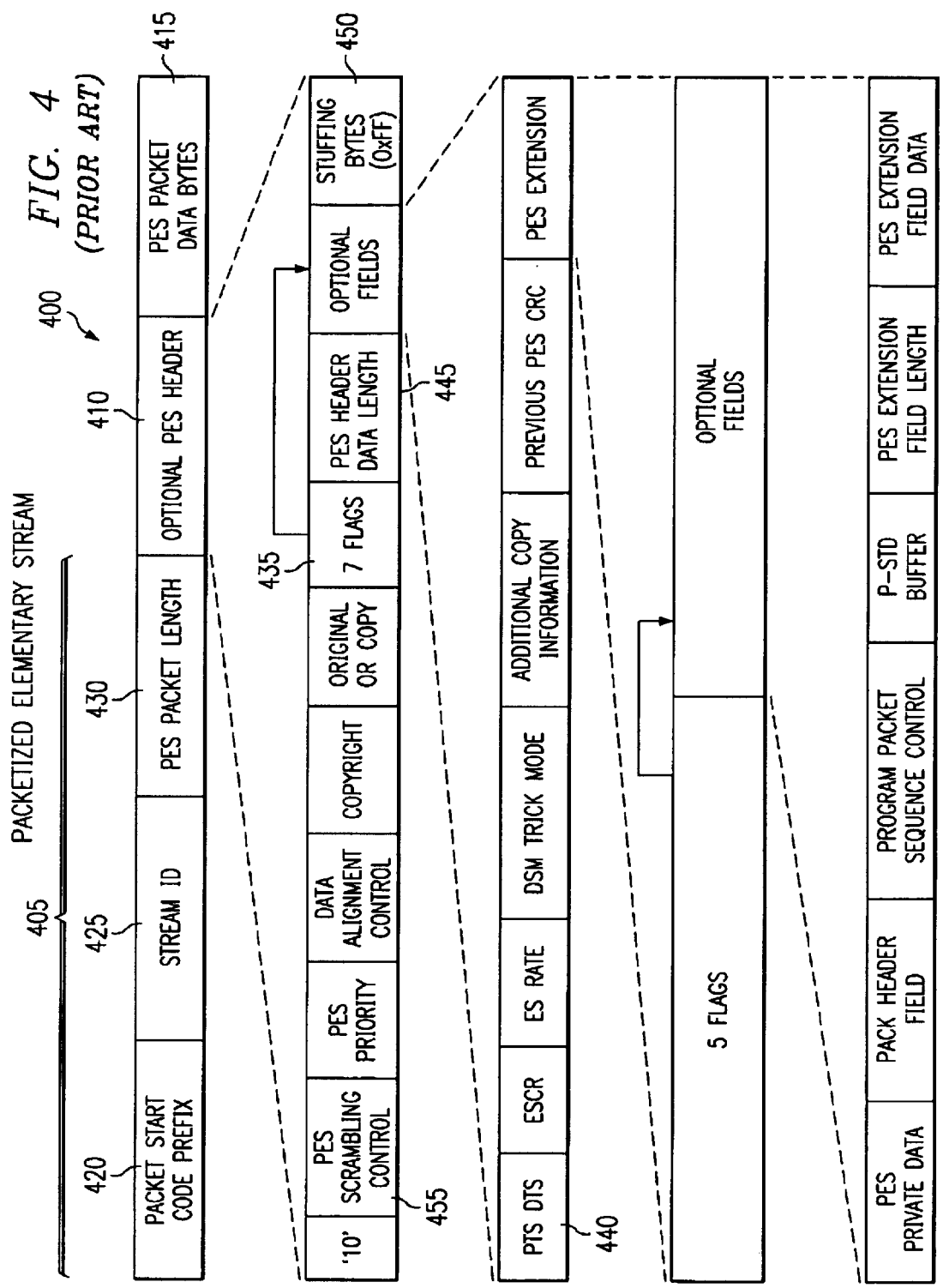
FIG. 4 illustrates a conceptual block diagram of a PES according to an exemplary embodiment of the prior art.
Figure 5:
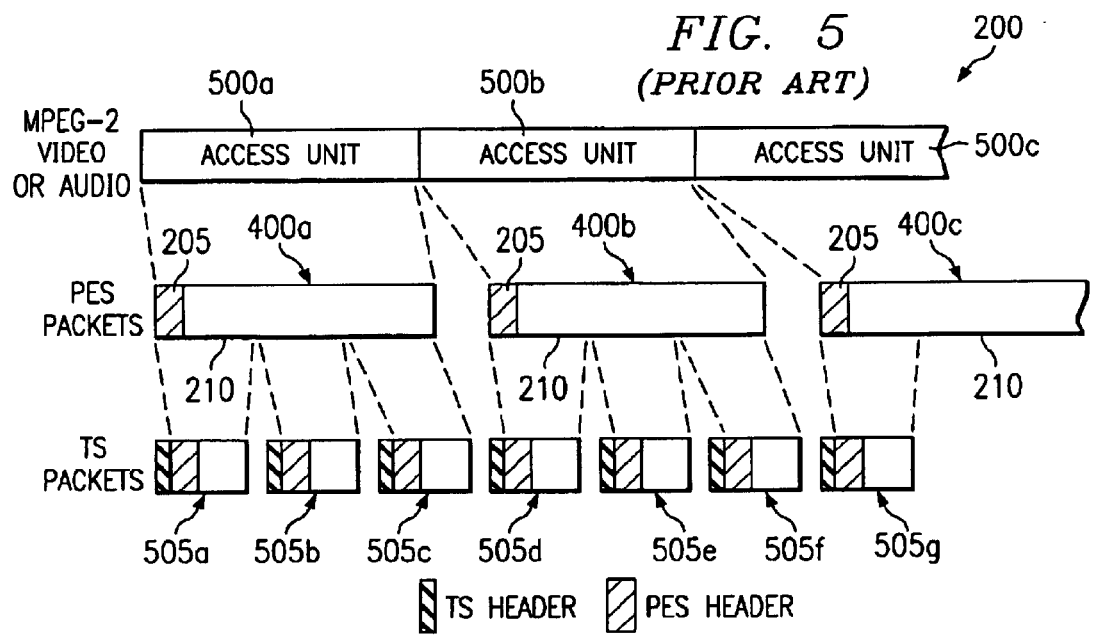
FIG. 5 illustrates a conceptual block diagram of an alternate time-division or packet-multiplexed bit stream according to an exemplary embodiment of the prior art.
Figure 6:
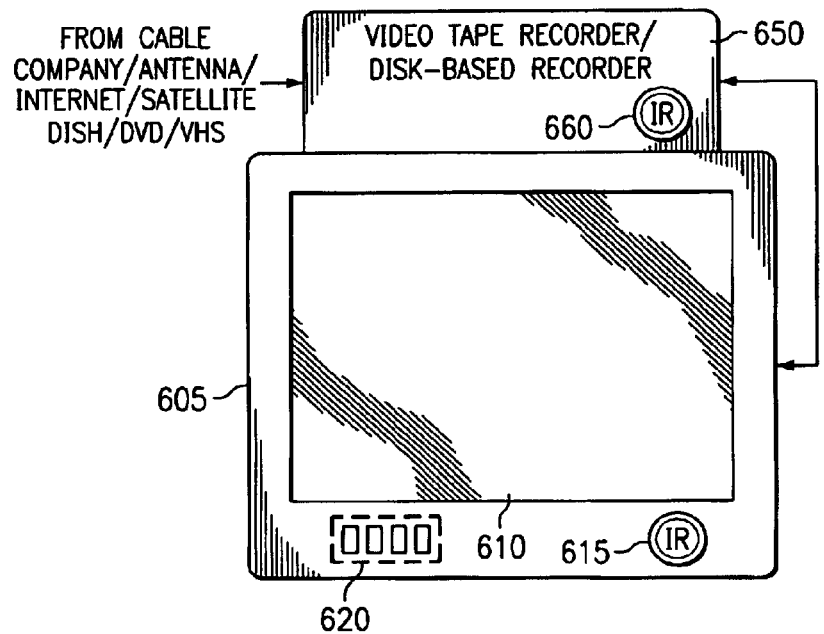
FIG. 6 illustrates an exemplary digital video recorder (DVR) system and an associated television set according to one embodiment of the present invention.

FIG. 6 illustrates exemplary digital video recorder (DVR) system 650 and television set 605 according to one embodiment of the present invention. Digital video recorder system 650 receives incoming television signals from an external source, such as a set-top box of a cable television service provider (Cable Co.) or the phone company, a local antenna, the Internet, a satellite television service provider, or an attached DVD or VHS tape player, and transmits a viewer-selected channel to television set 605. In RECORD mode, digital video recorder system 650 may demodulate an incoming radio frequency (RF) television signal to produce a baseband video signal that is recorded and stored on a storage medium within or connected to video playback device 650. In PLAY mode, digital video recorder system 650 retrieves a stored baseband video signal (i.e., program) selected by the user from the storage medium and transmits the retrieved program to television set 605.

According to an exemplary embodiment of the present invention, digital video recorder (DVR) system 650 is a disk drive-based device, such as a ReplayTV™ recorder or a TiVO™ recorder, DVR system 650 stores and retrieves the incoming television signals to and from a computer magnetic hard disk rather than a magnetic cassette tape. In still other embodiments, video playback device 650 may store and retrieve from a local read/write (R/W) digital versatile disk (DVD) or R/W CD-ROM. Thus, the local storage medium may be fixed (e.g., hard disk drive) or removable (e.g., DVD, CD-ROM).

Digital video recorder system 650 comprises infrared (IR) sensor 660 that receives commands (such as Channel Up, Channel Down, Volume Up, Volume Down, Record, Play, Fast Forward (FF), Reverse, and the like) from a remote control device operated by the viewer. Television set 605 is a conventional television comprising screen 610, infrared (IR) sensor 615, and one or more manual controls 620 (indicated by a dotted line). IR sensor 615 also receives commands (such as volume up, volume down, power ON/OFF) from a remote control device operated by the viewer.

It should be noted that DVR system 650 is not limited to receiving a particular type of incoming television signal from a particular type of source. As noted above, the external source may be a cable service provider, a conventional RF broadcast antenna, a satellite dish, an Internet connection, or another local storage device, such as a DVD player. Thus, the incoming signal may be a conventional digital signal, such as MPEG-2, an conventional NTSC analog signal, or digital Internet protocol (IP) packets of any other communication protocol. However, for the purposes of simplicity and clarity in explaining the principles of the present invention, the descriptions that follow shall generally be directed to an embodiment in which DVR system 650 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 7:
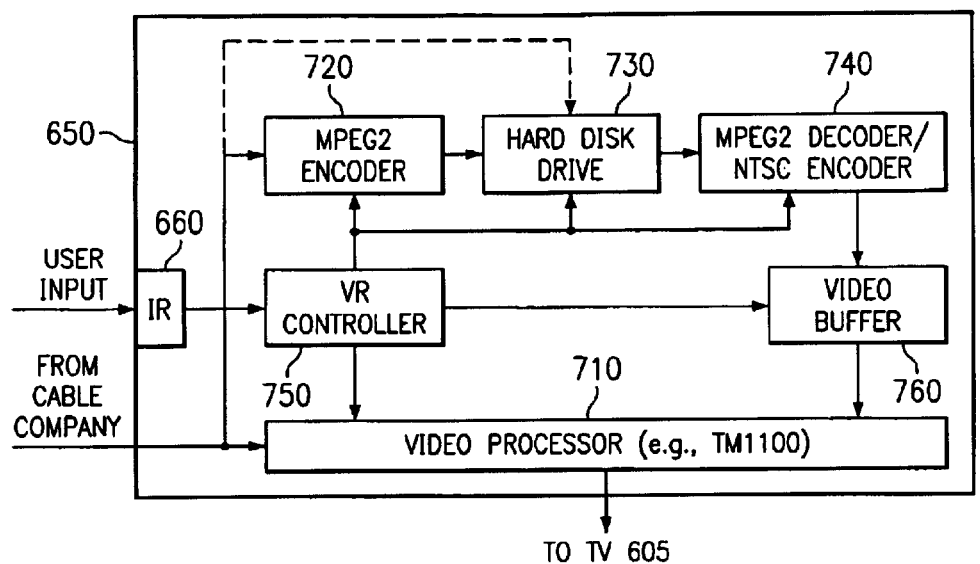
FIG. 7 illustrates the exemplary digital video recorder (DVR) system in greater detail according to one embodiment of the present invention.

FIG. 7 illustrates exemplary digital video recorder (DVR) system 650 in greater detail according to one embodiment of the present invention. DVR system 650 comprises IR sensor 660, video processor 710, optional MPEG-2 encoder 720, hard disk drive 730, MPEG-2 decoder/NTSC encoder 740. DVR system 650 further comprises video buffer 760 and video recorder (VR) controller 750.

VR controller 750 directs the overall operation of DVR system 650, including View mode, Record mode, Play mode, Fast Forward (FF) mode, Reverse mode, Pause mode, and Skip mode, among others. In View mode, VR controller 750 causes the incoming television signal from the cable service provider to be demodulated and processed by video processor 710 and transmitted to television set 605, without storing or retrieving from hard disk drive 730.

The internal circuitry of DVR system 650 varies depending on whether the external broadcast signal received by DVR system 650 is digital, such as MPEG-2, or analog, such as NTSC. For example, if the external broadcast signal received from the cable service provider is an analog signal, video processor 710 may be, for example, a TriMedia (TM) 6100 media processor, which contains radio frequency (RF) front-end circuitry for receiving incoming analog television signals, tuning to a user-selected channel, and converting the selected RF signal to a baseband television signal (e.g., super video signal) suitable for display on television set 605. Video processor 710 also is capable of receiving a conventional NTSC, PAL or SECAM signal from MPEG2 decoder/ NTSC encoder 740 (after buffering in video buffer 760) during Play mode and transmitting baseband television signal (e.g., super video signal) to television set 605. Alternatively, if the external broadcast signal is a digital signal, such as an MPEG-2 signal, video processor 710 may be a conventional digital TV decoder, such as an MPEG-2 decoder, that converts the digital input signal to a baseband television signal for display on television set 605.

In Record mode, VR controller 750 causes the incoming television signal to be stored on hard disk drive 730. MPEG-2 encoder 720 is optional provided if the external broadcast signal is an analog signal. For example, under the control of VR controller 750, MPEG-2 encoder 720 may receive an incoming NTSC-type analog television signal and convert the received broadcast signal to MPEG-2 format for storage on hard disk drive 730. Alternatively, if the external broadcast signal is already a digital signal, such as MPEG-2, then the broadcast signal may be stored directly to hard disk drive 730 and MPEG-2 may be omitted. In Play mode, VR controller 750 directs hard disk drive 730 to stream the stored television signal (i.e., program) to MPEG-2 decoder/ NTSC encoder 740, which converts the MPEG-2 data from hard disk drive 730 to, for example, a super video (S-Video) signal that is buffered in video buffer 760 before video processor 710 transmits it to television set 605.

It should be noted that the choice of the MPEG-2 standard for MPEG-2 encoder 720 and MPEG-2 decoder/NTSC encoder 740 is by way of illustration only. In alternate embodiments of the present invention, the MPEG encoder and decoder may comply with one or more of the MPEG-1, MPEG-2, MPEG-4, and MPEG-7 standards. In still other alternate embodiments, the digital television encoding and decoding circuitry may comply with some other digital television standard.

For the purposes of this application and the claims that follow, hard disk drive 730 is defined to include any mass storage device that is both readable and writable, including conventional magnetic disk drives, and optical disk drives for read/write digital versatile disks (DVD-RW), re-writable CD-ROMs, and the like. In fact, hard disk drive 730 need not be fixed in the conventional sense that is permanently embedded in DVR system 650. Rather, hard disk drive 730 includes any mass storage device that is dedicated to DVR system 650 for the purpose of storing recorded television programs. Thus, hard disk drive 730 may include an attached peripheral drive or removable disk drives (whether embedded or attached), such as a juke box device that holds read/write DVDs or re-writable CD-ROMs. Furthermore, in an advantageous embodiment of the present invention, hard disk drive 730 may include external mass storage devices that DVR system 650 may access and control via a network connection (e.g., Internet protocol (IP) connection), including, for example, a disk drive in a home personal computer (PC) or a disk drive on a server at an Internet service provider (ISP).

As noted above, synchronization of a decoding system with a channel is achieved through the use of the system clock reference (SCR) in the program stream and by its analog, the program clock reference (PCR), in the transport stream. However, as discussed in the Background above, in a digital video recorder (DVR) system with packetized elementary stream (PES) storage, the systems time clock (STC) and the program clock reference (PCR) are lost when a recorded television program is stored to the disk drive. Accordingly, the present invention provides an improved video and audio synchronization circuit and related method for use in MPEG-2 decoder/NTSC encoder 740 in DVR system 650.

Figure 8:
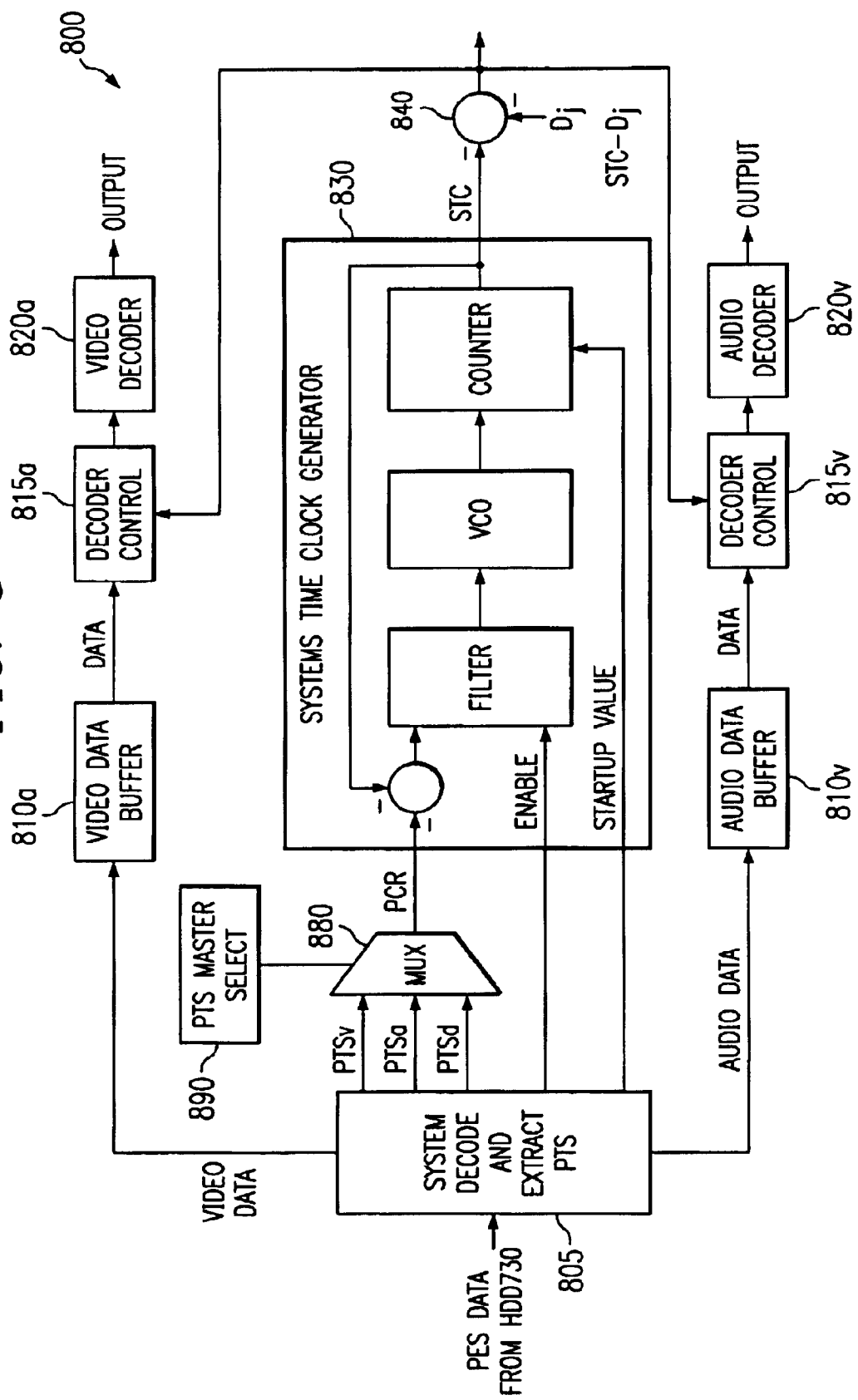
FIG. 8 illustrates an MPEG-2 decoding system in the exemplary DVR system according to an exemplary embodiment of the present invention.

FIG. 8 illustrates MPEG-2 decoding system 800 in MPEG-2 decoder/NTSC encoder 740 according to an exemplary embodiment of the present invention. Most of the components of MPEG-2 decoding system 800 are well known to those skilled in the art. During playback, MPEG-2 decoding system 800 receives packetized elementary stream (PES) data from hard disk drive 730 as an input to system decoder and extract PTS block 805. System decoder and extract PTS block 805 de-multiplexes PES data into the compressed audio layer, the compressed video layer, control data, and presentation time stamps. The exemplary compressed audio layer data and video layer data are transferred to audio data buffer 810*a* and video data buffer 810*v*, respectively. The audio layer data is subsequently processed in audio decoder control block 815*a* and audio decoder 820*a*. The video layer data is subsequently processed in video decoder control block 815*v* and video decoder 820*v*.

Exemplary control data is shown as video presentation time stamp (PTSv) data, audio presentation time stamp (PTSa) data, data presentation time stamp (PTSd) data, enable data, and startup values. The PTSv data, PTSa data, and PTSd data extracted by system decoder and extract PTS block 805 are transferred to the input channels of multiplexer (MUX) 880. Presentation time stamp (PTS) master select circuit 890 selects one of the input channels i of MUX 880 to be output as a substitute program reference clock (PCR) value to systems time clock generator 830.

Figure 9:
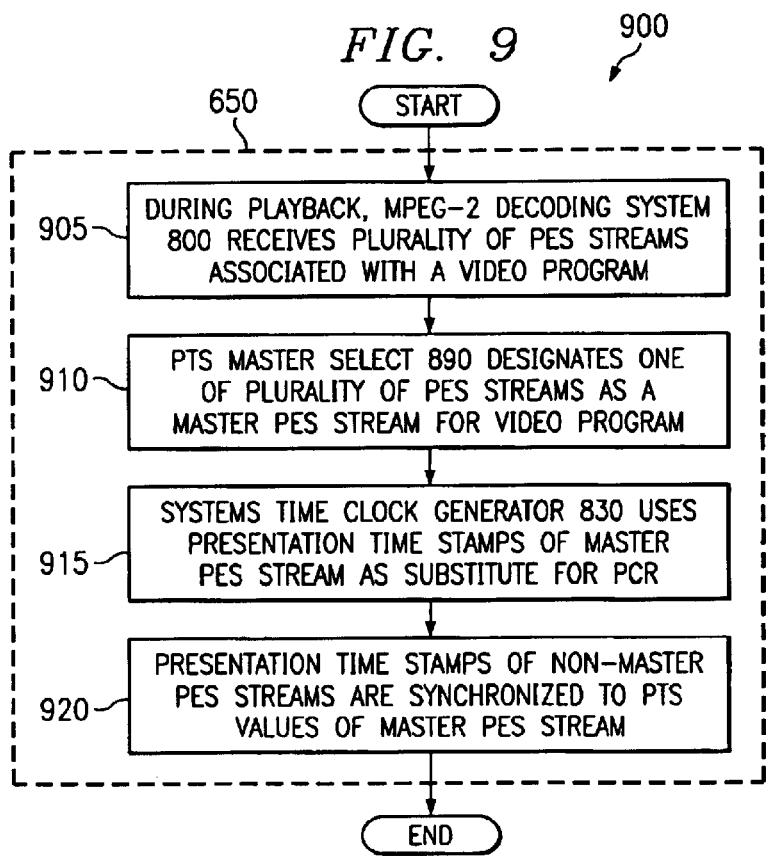
FIG. 9 is a flow chart illustrating the operation of the MPEG-2 decoding system according to an exemplary embodiment of the present invention.

FIG. 9 depicts flow chart 900, which illustrates the operation of MPEG-2 decoding system 800 according to an exemplary embodiment of the present invention. During playback, MPEG-2 decoding system 800 receives plurality of PES streams associated with a video program (process step 905). PTS master select 890 designates one of plurality of PES streams as a master PES stream for video program (process step 910). Systems time clock generator 830 uses presentation time stamps of master PES stream as substitute for PCR (process step 915). Presentation time stamps of non-master PES streams are synchronized to PTS values of master PES stream (process step 920). The present invention maintains a counter representing the master PTS values as free-running and synchronizes all the other streams on the master PTS values.

Although the present invention has been described in detail, those skilled in the art should understand that they can make various changes, substitutions and alterations herein without departing from the spirit and scope of the invention in its broadest form.

What is claimed is:

1. An MPEG decoder comprising:
   a packetized elementary stream (PES) interface capable of receiving a plurality of packetized elementary streams associated with a single video program;
   a presentation time stamp (PTS) detection circuit capable of detecting presentation time stamps in said packetized elementary streams and extracting said presentation time stamps therefrom; and
   a selection circuit capable of selecting presentation time stamps associated with a first one of said plurality of packetized elementary streams and transmitting said selected presentation time stamps to a clock generation circuit, wherein said clock generation circuit generates a first reference clock signal used by a first decoder to decode said first packetized elementary stream.

2. The MPEG decoder as set forth in claim 1 wherein said clock generation circuit further generates a second reference clock signal synchronized to said first reference clock signal and wherein said second reference clock signal is used by a second decoder to decode a second packetized elementary stream in synchronization with said first packetized elementary stream.

3. The MPEG decoder as set forth in claim 2 wherein said selected presentation time stamps are video presentation times stamps and said first decoder is a video decoder.

4. The MPEG decoder as set forth in claim 3 wherein said second decoder is an audio decoder.

5. The MPEG decoder as set forth in claim 2 wherein said selected presentation time stamps are audio presentation times stamps and said first decoder is an audio decoder.

6. The MPEG decoder as set forth in claim 5 wherein said second decoder is a video decoder.

7. The MPEG decoder as set forth in claim 2 said clock generation circuit generates said second reference clock signal by synchronizing presentation time stamps associated with said second packetized elementary stream with said selected presentation time stamps associated with said first packetized elementary stream.

8. A digital video recorder capable of playing back a recorded television program stored as packetized elementary streams, said digital video recorder comprising:
   a video processor capable of receiving an incoming television program and converting said incoming television program to a baseband video signal capable of being displayed on a television set coupled to said digital video recorder;
   a storage disk capable of storing said incoming television program as packetized elementary streams during recording; and
   an MPEG decoder comprising:
   a packetized elementary stream (PES) interface capable of receiving a plurality of packetized elementary streams associated with said recorded television program from said storage disk during playback;
   a presentation time stamp (PTS) detection circuit capable of detecting presentation time stamps in said packetized elementary streams and extracting said presentation time stamps therefrom; and
   a selection circuit capable of selecting presentation time stamps associated with a first one of said plurality of packetized elementary streams and transmitting said selected presentation time stamps to a clock generation circuit, wherein said clock generation circuit generates a first reference clock signal used by a first decoder to decode said first packetized elementary stream.

9. The digital video recorder as set forth in claim 8 wherein said clock generation circuit further generates a second reference clock signal synchronized to said first reference clock signal and wherein said second reference clock signal is used by a second decoder to decode a second packetized elementary stream in synchronization with said first packetized elementary stream.

10. The digital video recorder as set forth in claim 9 wherein said selected presentation time stamps are video presentation times stamps and said first decoder is a video decoder.

11. The digital video recorder as set forth in claim 10 wherein said second decoder is an audio decoder.

12. The digital video recorder as set forth in claim 9 wherein said selected presentation time stamps are audio presentation times stamps and said first decoder is an audio decoder.

13. The digital video recorder as set forth in claim 12 wherein said second decoder is a video decoder.

14. The digital video recorder as set forth in claim 9 said clock generation circuit generates said second reference clock signal by synchronizing presentation time stamps associated with said second packetized elementary stream with said selected presentation time stamps associated with said first packetized elementary stream.

15. For use in a digital video recorder, a method for decoding a television program stored in MPEG format:

receiving in an MPEG decoder a plurality of packetized elementary streams associated with the stored television program;

detecting presentation time stamps in the packetized elementary streams;

extracting the presentation time stamps from the packetized elementary streams;

selecting presentation time stamps associated with a first one of the plurality of packetized elementary streams; and generating from the selected presentation time stamps a first reference clock signal used by a first decoder to decode the first packetized elementary stream.

16. The method as set forth in claim 15 further comprising the step of generating a second reference clock signal synchronized to the first reference clock signal, wherein the second reference clock signal is used by a second decoder to decode a second packetized elementary stream in synchronization with the first packetized elementary stream.

17. The method as set forth in claim 15 wherein the selected presentation time stamps are video presentation times stamps and the first decoder is a video decoder.

18. The method as set forth in claim 16 wherein the second decoder is an audio decoder.

19. The method as set forth in claim 15 wherein the selected presentation time stamps are audio presentation times stamps and the first decoder is an audio decoder.

20. The method as set forth in claim 16 wherein the second decoder is a video decoder.

21. The method as set forth in claim 16 wherein the step of generating a second reference clock signal comprises the sub-step of synchronizing presentation time stamps associated with the second packetized elementary stream with the selected presentation time stamps associated with the first packetized elementary stream.

* * * * *